(No Model.)

H. SCHWEITZER.
NUT LOCK.

No. 588,661. Patented Aug. 24, 1897.

Witnesses:
H. B. Hallock
S. Williamson

Inventor
Henry Schweitzer
by Geo. H. Holgate
Attorney

THE NORRIS PETERS CO., PHOTO-LITHO., WASHINGTON, D. C.

UNITED STATES PATENT OFFICE.

HENRY SCHWEITZER, OF FREEMANSBURG, PENNSYLVANIA.

NUT-LOCK.

SPECIFICATION forming part of Letters Patent No. 588,661, dated August 24, 1897.

Application filed December 4, 1896. Serial No. 614,492. (No model.)

*To all whom it may concern:*

Be it known that I, HENRY SCHWEITZER, a citizen of the United States, residing at Freemansburg, in the county of Northampton and State of Pennsylvania, have invented certain new and useful Improvements in Nut-Locks, of which the following is a specification.

My invention relates to a new and useful improvement in nut-locks, and has for its object to provide a device of this description which shall be simple of construction, readily applied, and when in place cannot be accidentally removed, and will securely hold the nuts against retrograde movement and yet may be easily withdrawn in order that the nuts may be tightened to compensate for wear and again replaced, so as to hold said nuts as before described.

With these ends in view my invention consists in the details of construction and combination of elements hereinafter set forth, and then specifically designated by the claims.

In order that those skilled in the art to which this invention appertains may understand how to make and use the same, I will describe its construction and operation in detail, referring by letter to the accompanying drawings, forming a part of this specification, and in which—

Figure 1:
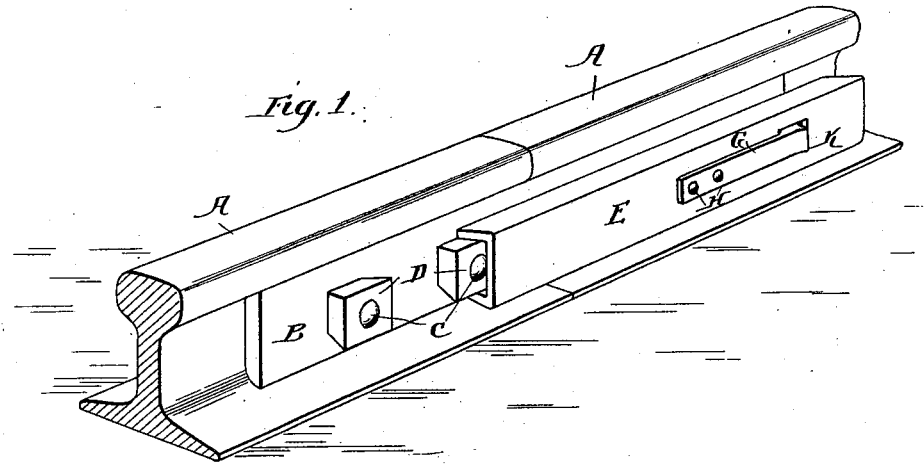
Figure 2:
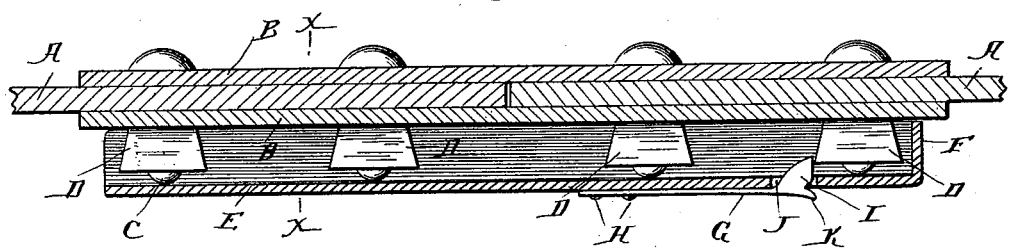
Figure 3:
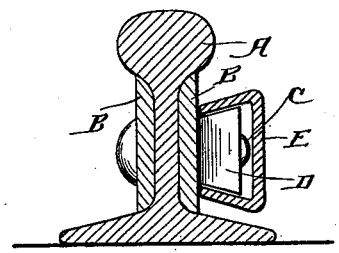

Figure 1 is a perspective of the meeting ends of two railway-rails secured together by the usual fish-plates, bolts, and nuts and showing the application of my improvement thereto; Fig. 2, a horizontal longitudinal section of the rails and the lock secured in position around the nuts, and Fig. 3 a cross-section at the line *x x* of Fig. 2.

Referring to the drawings in detail, A represents the ordinary rails of a railway, which are secured together by the fish-plates B, bolts C, and nuts D in the usual manner, and to prevent the retrograde movement of these nuts I provide a lock which consists of a housing E, made in trough form, whose cross-section corresponds to the shape of the nuts and is thus adapted to slide over said nuts, as clearly shown, and in order that this housing may be more securely held in place I prefer to slightly bevel the sides of the nuts, so that when the sides of the housing are of a corresponding bevel said housing may not be withdrawn from said nuts except longitudinally, as will be readily understood.

In practice I prefer to close the end of the housing, as at F, and secure a detent G thereto at H, which detent is provided with a nose I, adapted to engage with one of the nuts by projecting through a suitable opening J in the housing, as shown in Fig. 2. This detent is preferably made of spring metal, so that it will be sufficiently resilient to hold the nose in engagement with the nut until released by an outward pressure, and to facilitate this disengagement of the nose from the nut I provide a projection K, by which the detent may be drawn outward.

Thus it will be seen that when the nuts have been properly set in securing the rails together they may be held against any retrograde movement by the engagement thereof of the housing and the locking of said housing in position by the detent, as just described, and when it is necessary to further adjust the nuts to compensate for wear, as is often the case, it is only necessary to withdraw the detent from engagement with the nut and slide the housing longitudinally, thus exposing the nuts for application of a suitable wrench.

It is obvious that the exact design here shown and described may be altered to a certain extent without departing from the spirit of my invention, and I therefore do not wish to be limited to this exact construction.

Having thus fully described my invention, what I claim as new and useful is—

1. In combination with a series of nuts having beveled sides, a housing having sides correspondingly beveled, said housing being closed at one end and means for preventing the housing from slipping in the direction of the closed end when adjusted, substantially as described.

2. In combination with a series of nuts having their sides beveled, a housing of trough shape whose sides in cross-section are adapted to be beveled of said nuts, said housing having one of its ends closed, and a detent secured to said housing having a nose projecting through an opening so as to engage one of said nuts, substantially as shown and described.

3. A nut-lock consisting of a housing adapted to be slipped longitudinally on a series of nuts, said housing being closed at one end, and a detent protruding through the housing into engagement with the side of a nut opposite the closed end of the housing, and means for preventing the housing from being slipped any way but longitudinally, substantially as described.

In testimony whereof I have hereunto affixed my signature in the presence of two subscribing witnesses.

HENRY SCHWEITZER.

Witnesses:
S. S. WILLIAMSON,
HARRY S. SCHWEITZER.